United States Patent
Pleschiutschnigg et al.

(10) Patent No.: US 8,021,599 B2
(45) Date of Patent: Sep. 20, 2011

(54) METHOD AND INSTALLATION FOR PRODUCING STEEL PRODUCTS WITH OPTIMUM SURFACE QUALITY

(75) Inventors: Fritz-Peter Pleschiutschnigg, Duisburg (DE); Karl-Ernst Hensger, Schkeuditz (DE); Dieter Rosenthal, Niederfischbach (DE); Rainer Teworte, Duisburg (DE); Dieter Tembergen, Duisburg (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 12/378,305

(22) Filed: Feb. 13, 2009

(65) Prior Publication Data

US 2010/0000062 A1 Jan. 7, 2010

Related U.S. Application Data

(62) Division of application No. 10/559,802, filed as application No. PCT/EP2004/005580 on May 25, 2004.

(30) Foreign Application Priority Data

Jun. 7, 2003 (DE) .................................. 103 25 955

(51) Int. Cl.
  *C21B 13/12* (2006.01)
  *C21C 5/28* (2006.01)
  *C21C 7/076* (2006.01)
  *C21C 7/10* (2006.01)

(52) U.S. Cl. ......... 266/142; 373/60; 373/78; 164/160.1; 164/167; 164/418

(58) Field of Classification Search ............. 266/142; 164/160.1, 167, 418
See application file for complete search history.

(56) References Cited

U.S. PATENT DOCUMENTS

| | | | | | |
|---|---|---|---|---|---|
| 3,523,785 | A | * | 8/1970 | Gero | 164/466 |
| 3,533,261 | A | * | 10/1970 | Hollander et al. | 72/201 |
| 5,307,864 | A | * | 5/1994 | Arvedi et al. | 164/476 |
| 6,209,620 | B1 | * | 4/2001 | Pleschiutschnigg | 164/461 |
| 6,216,770 | B1 | * | 4/2001 | Hensger et al. | 164/476 |
| 6,491,771 | B1 | * | 12/2002 | von Hagen et al. | 148/541 |
| 2002/0005266 | A1 | * | 1/2002 | Pleschiutschnigg et al. | 164/442 |
| 2003/0230163 | A1 | * | 12/2003 | Pleschiutschnigg et al. | 75/10.42 |
| 2004/0232605 | A1 | * | 11/2004 | Rosenthal et al. | 266/50 |

FOREIGN PATENT DOCUMENTS

| | | | |
|---|---|---|---|
| JP | 61078544 A | * | 4/1986 |
| JP | 06100949 A | * | 4/1994 |

OTHER PUBLICATIONS

Machine translation of JP 06100949 A published Apr. 1994.*

* cited by examiner

*Primary Examiner* — George Wyszomierski
*Assistant Examiner* — Tima M McGuthry-Banks
(74) *Attorney, Agent, or Firm* — Lucas & Mercanti, LLP; Klaus P. Stoffel (57) ABSTRACT

A method for producing steel products (1) with optimum surface quality wherein the molten steel (1b) is produced in a process route (10, 100; 12; 13) that is selected according to a desired final microstructure (9), by melting in a furnace (2b) with an electrode system (31), and in a vacuum degassing system; or by melting in a furnace installation (35) or an individual furnace vessel (30), in a ladle furnace (25), and in a differential-pressure vacuum degassing system (43); or by melting in a furnace (2b) with additions of alloying materials (26), a partial-quantity degassing in the ladle furnace (25), or a vacuum degassing system (27) and a ladle degassing (27).

6 Claims, 5 Drawing Sheets

METHOD AND INSTALLATION FOR PRODUCING STEEL PRODUCTS WITH OPTIMUM SURFACE QUALITY

CROSS-REFERENCE TO RELATED APPLICATIONS

The present application is a Divisional Application of U.S. patent application Ser. No. 10/559,802 filed Mar. 26, 2007, which is a 371 of PCT/EP04/05580 filed May 25, 2004.

The invention concerns a method and an installation for producing steel products with optimum surface quality, especially with ultralow carbon contents (ULC or IF steel), nitrogen contents, total oxygen contents, and high-strength or stainless steel grades, in each case by melting, treatment in a ladle metallurgy installation, continuous casting in slab format, rolling, cooling, and usually coiling of the rolled product.

Steel products of this type in various steel grades have previously been produced by melting in a converter, treatment in the ladle metallurgy installation with vacuum degassing, and casting as thick slabs in a continuous casting machine, and then rolled in roughing mills and finishing mills. Production by means of other process routes, e.g., the electric arc furnace process from scrap, was not considered possible, because then the extremely low contents of such elements as C, N, S, O, <O>, and quality-reducing trace elements, e.g., Cu and Zn, cannot be achieved or can be achieved only under difficult conditions. These process routes do not allow the optimum surface quality that is being strived for to be achieved. There is a lack, for example, of the required geometric, physical, and structural product properties of ULC and IF hot rolled strip that are necessary prerequisites for effective microstructural control and systematic adjustment of product properties.

The objective of the invention is to produce the specified steel grades and other steel grades by new process routes in order to achieve the required ultralow contents of C, N, S, O, <O>, and quality-reducing trace elements, e.g., Cu and Zn, for steel products with optimum surface quality.

In accordance with the invention, this objective is achieved by a method that is characterized by the fact that molten steel is produced in a process route which is based on an electric arc furnace and which is selected according to the desired final microstructure; by the fact that the molten steel from the selected process route is then cast into a thin slab in the continuous casting mold; by the fact that the thin slab is descaled, partially deformed, cut to partial lengths, generally descaled, heated to rolling temperature and homogenized in a soaking furnace, generally descaled again, and rolled in a finishing mill; by the fact that the rolled product is coiled in a first coiling station immediately downstream of the last finishing stand or, alternatively, downstream of a cooling line; by the fact that the final microstructure is adjusted in a cooling line according to the desired grade of steel by cooling on a runout table; and by the fact that the rolled product is generally finish-coiled in a second coiling station. In this way, the steel products can be produced downstream of the ladle metallurgy installation on the basis of thin slabs and finished as coiled strip, sections of strip, or other flat products and possibly long products with high surface quality and a very exact final microstructure.

In accordance with additional steps, steel products of this type, whose final microstructure can be more exactly controlled, can be produced in different process routes. In accordance with a first alternative, it is proposed that successive treatment steps be carried out as a first process route in an electric arc furnace and
in a ladle metallurgy installation
   with at least one vacuum degassing system followed by a ladle furnace for decarbonization, reduction, and addition of alloying materials,
   with a ladle furnace for slag formation, for slag work, for temperature control, for final adjustment of the final analysis, and for purity rinsing to Δ <Al> contents.

The advantage consists in the final microstructure of the aforementioned ULC, IF, high-strength and stainless steel grades, which, after a vacuum treatment, has values of <20 ppm to 30 ppm for C, <3 ppm for $\underline{O}$, <15 ppm for <O>, 20-30 ppm for N, and <100 ppm for S. The steel that is cast in the continuous casting machine has these values.

After being tapped from the electric arc furnace, the steel has the following values before the vacuum treatment is carried out: C=400-600 ppm, S<150 ppm, N<35 ppm, and oxygen-free <600 ppm. After the degassing treatment, these values fall to C<15 ppm, S<150 ppm, N<35 ppm, and O<3 ppm. The advantages are moderate foaming during slag formation (assuming 100% DRI), slag-free tapping, the possible slag additives, and prereduction by FeMnHC.

After the ladle furnace treatment, these values can be further altered for the casting operation in the continuous casting machine to C<25 ppm, S<50 ppm, N<35 ppm, $\underline{O}$<3 ppm and <O> <15 ppm.

During the vacuum treatment of the steel by the partial-quantity method, basically a decarbonization, a deoxidation, and an addition of ferroalloys is undertaken. The necessary refining of the ladle slag, the desulfurization, and the final adjustment of the chemical analysis of the molten steel occur during the ladle furnace treatment, which is concluded by a purity treatment.

During the addition of slag additives, slag work in the steel, a heating operation, the desulfurization, and an adjustment of the final analysis, another purity rinsing is carried out, which considerably increases the preciseness of the final grade. Before the molten steel is cast, the following values can be adjusted: C<25 ppm, S<50 ppm, N<35 ppm, $\underline{O}$<3 ppm and <O> <15 ppm.

In accordance with a second alternative, it is proposed that successive treatment steps be carried out as a second process route in an electric arc furnace or an electric arc furnace installation and
in a ladle metallurgy installation
   with a ladle furnace for slag formation,
     ⇒for the heating
     ⇒and for the prereduction (FeMnHC) of the steel
   with a vacuum degassing system
     ⇒for the decarbonization and denitrogenation
     ⇒for the reduction of the slag on the steel surface
     ⇒for the desulfurization under reduced pressure,
     ⇒for the final adjustment of the final analysis and
     ⇒for the purity rinsing to Δ <Al> under atmospheric pressure.

The advantages are that it is also possible to charge up to 100% DRI or pig iron or hot metal and scrap in any desired proportions. Slag-free deslagging can then be carried out. Additional slag is produced during the ladle furnace treatment; the total ladle slag reaches about 8 kg/t. Heating and adjustment of the reduction slag (with FeMnHC) are then carried out. During the treatment in the vacuum degassing system, a decarbonization, a reduction and slag work, a desulfurization and a denitrogenation under reduced pressure, an adjustment of the final analysis, and stirring for the degree of purity under atmospheric pressure are carried out.

In accordance with a third alternative, it is proposed that successive treatment steps be carried out as a third process route in an electric arc furnace or in an electric arc furnace installation and
in a ladle metallurgy installation
with a ladle furnace
⇒for temperature control and
⇒for prereduction (FeMnHC)
with at least one differential-pressure degassing process for the decarbonization, desulfurization (under pressure) and denitrogenation, reduction, and addition of alloying materials from an iron alloy, and with final adjustment
⇒of the final analysis and
⇒for the purity rinsing to <Al> contents of <15 ppm bound aluminum <$Al_2O_3$> or <O> of <15 ppm under atmospheric pressure.

The advantages are that the molten steel attains the following values in the electric arc furnace:
C 500-800 ppm;
O 500-700 ppm;
N 60-100 ppm;
S 160-300 ppm.

The following values are then attained in the vacuum degassing system:
C<40 ppm;
O<3 ppm;
N<40 ppm;
S<50 ppm;
<Al> <15 ppm.

The steel is cast with the following values in the downstream CSP continuous casting machine:
C<50 ppm;
O<3 ppm;
N<40 ppm;
S<50 ppm;
<Al> <15 ppm.

In accordance with a fourth alternative, it is proposed that successive treatment steps be carried out as a fourth process route in an electric arc furnace or in an electric arc furnace installation and
in a ladle metallurgy installation
with a ladle furnace for temperature control and a subsequent partial-quantity degassing for decarbonization and denitrogenation, desulfurization, with a ladle degassing for the final adjustment of the final analysis and for purity rinsing to Δ <Al> contents.

The advantages are likewise the attainment of very low values of the companion elements for casting in the thin-slab continuous casting machine and the adjustment of the final microstructure.

In one embodiment, a descaling is carried out directly below the continuous casting mold. The purpose of this step is preparation for ensuring optimum surface quality by controlling the scaling processes in the continuous casting machine, wherein special methods of descaling can be used.

Another step in this direction consists in undertaking controlled high-temperature oxidation by a controlled atmosphere in the soaking furnace.

This purpose is assisted by the additional feature of inductive heating of the partial strand lengths downstream of the soaking furnace. In this way, the heating can be transferred to the partial length of strand systematically, uniformly, and very quickly.

The most favorable temperature level is then reached by controlled cooling of the partial strand lengths before the first finishing stand of the finishing mill.

In another step, the final microstructure can be systematically adjusted by controlled cooling of continuous product coiled in the second coiling station.

Another improvement consists in using an electric arc furnace installation with two furnace vessels, which are alternately operated with a swiveled electrode system and an oppositely swiveled top injection lance, are operated with pig iron, direct reduced charge materials, and scrap, and are operated partially with electric power and/or chemical energy (so-called CONARC® processes)

The method can be applied in such a way that steels with multiphase microstructure (dual-phase steel or TRIP steel) are produced.

The installation for producing steel products with optimum surface quality, especially with ultralow carbon contents (ULC or IF steel), nitrogen contents, total oxygen contents, high-strength and/or stainless steel grades, is based on a prior art using at least a melting installation, a ladle metallurgy installation, a continuous casting machine for slab strands, a rolling mill, a runout table, and a coiling station.

In accordance with the invention, the stated objective is achieved by using a melting installation, which consists of an electric arc furnace installation, with a ladle metallurgy installation that is downstream with respect to the material flow, by providing the continuous casting machine with a continuous casting mold in thin-slab format, and by providing in the material flow at least one descaling system, a shear, a soaking furnace, a finishing mill, and at least one rollout table with a cooling line upstream or downstream of a coiling station. In this way, all advantages are achieved for a desired final microstructure of hot strip, long products, and the like, which are necessary for ULC, IF, high-strength, or stainless steels.

A feature that is aimed especially at achieving optimum surface quality of the finished steel product consists in providing a descaling system in the continuous casting machine directly below the continuous casting mold.

The quality of the surface of the steel product can be further ensured by providing a descaling system not only downstream of the continuous casting mold and downstream of the shear but also upstream of the first rolling stand of the finishing mill.

In another embodiment, a liquid core reduction line or a soft reduction line is arranged upstream of the shear in the containment roll stand of the continuous casting machine.

In another measure for creating favorable conditions for the final processing of the steel product, the continuous casting mold is designed as a continuous casting mold with a pouring gate.

In accordance with a further improvement, the rolled product is heated in an advantageous way by providing an inductive heating installation in the material flow between the soaking furnace and the first rolling stand of the finishing mill or the descaling system.

Another embodiment provides that the cooling line comprises a laminar cooling line combined with several intensive cooling boxes.

The drawings show specific embodiments of the installation, and the method is described in greater detail below with reference to these drawings.

Figure 1:
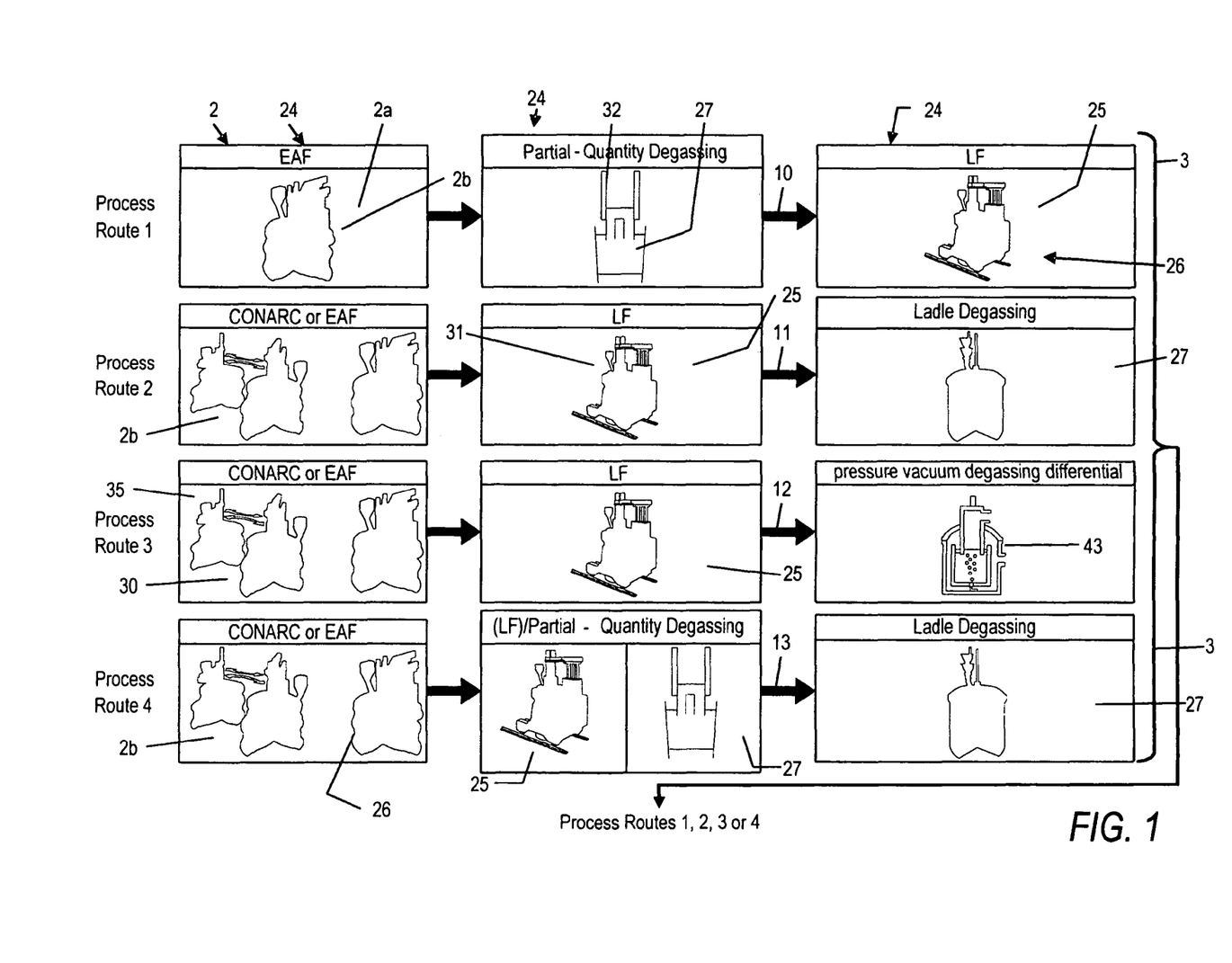
FIG. 1 shows functional block diagrams of process routes, which are alternatively arranged upstream of a continuous casting and rolling installation.
Figure 2A:
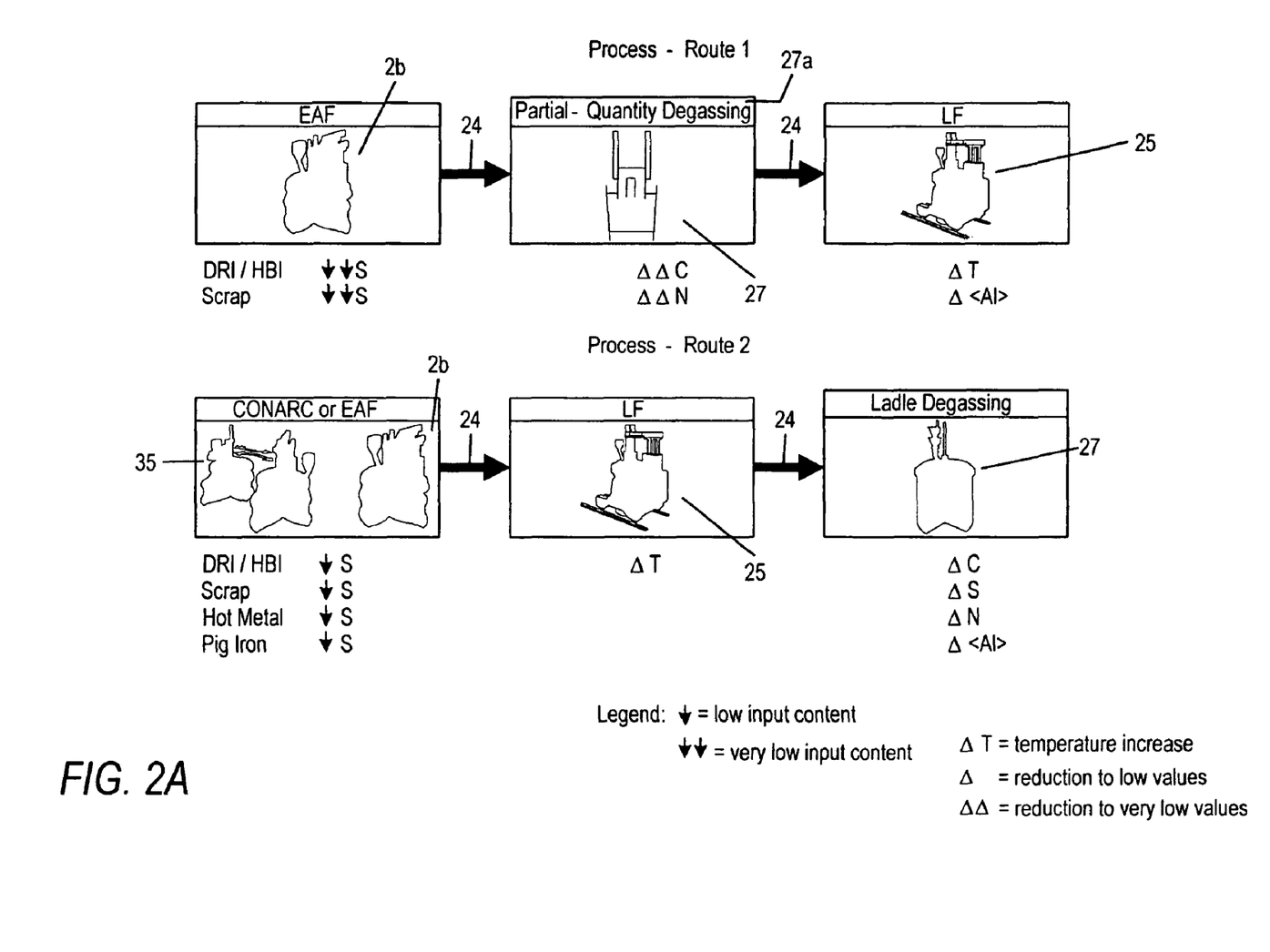
FIG. 2A shows process routes 1 and 2 in an enlarged view.
Figure 2B:
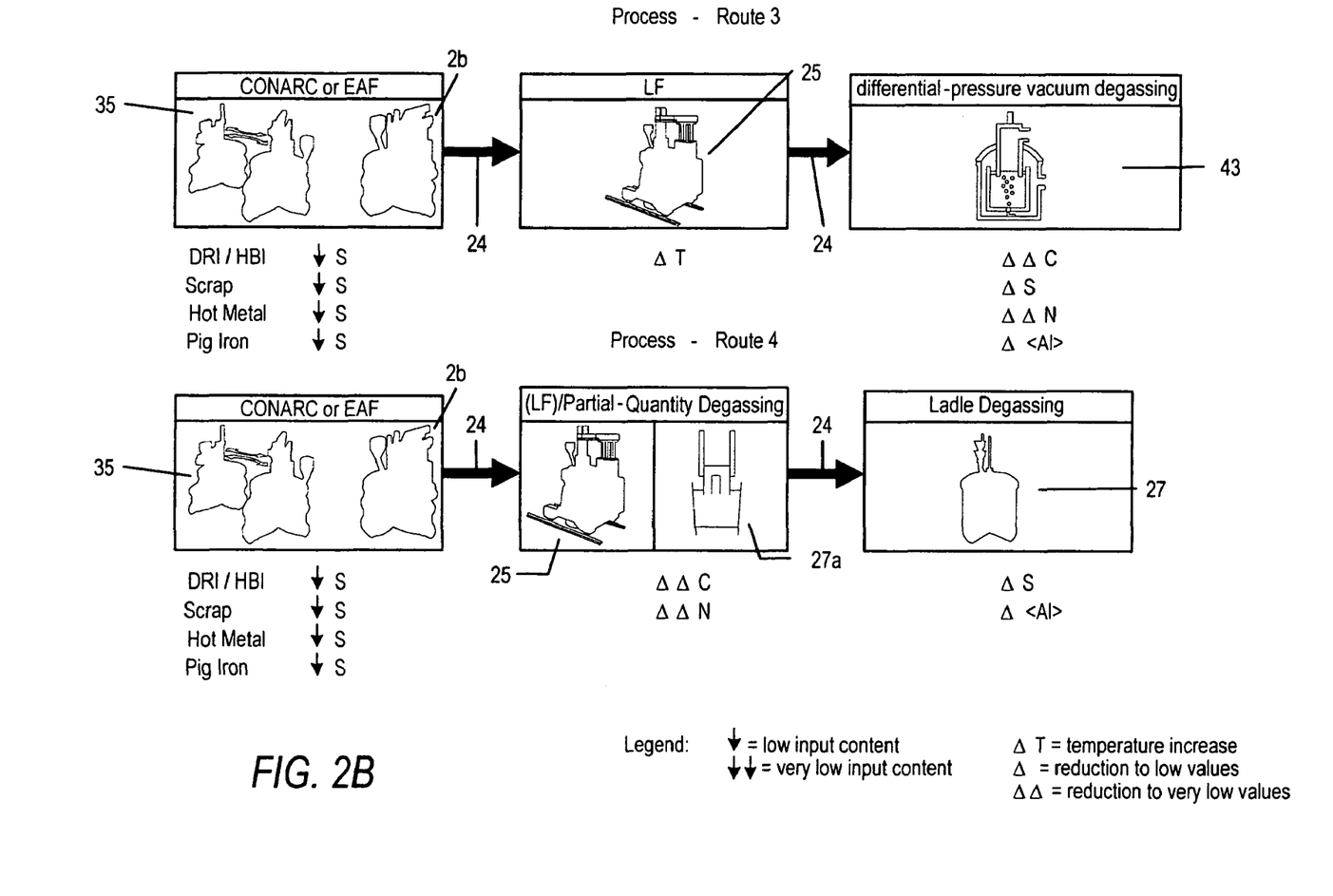
FIG. 2B shows process routes 3 and 4 in an enlarged view.

In accordance with FIG. 1 and FIGS. 2A and 2B, the steel product 1 can be produced as hot strip for further processing (e.g., automobile skin sheet, sheet for welded pipes, and the like.)

The liquid steel 1b is produced by melting 2 in a melting installation 2a, which is not a steelworks converter but rather an electric arc furnace 2b. The tapped steel then passes through a ladle metallurgy installation 3 and a continuous casting process 4 with a continuous casting machine 4a. However, the slab format 5 that is cast there is not a thick slab but rather a thin slab 5a with customary thicknesses of <100 mm. Rolling 6 is then carried out in a finishing mill 6a. The rolling stock 1a in the form of continuous product 1c (sheet, strip, long products, and the like) is subjected to controlled cooling on a rollout table 22. The cooling 7 is carried out on the basis of important criteria that will be described later. Apart from certain exceptions, the continuous product 1c with a final microstructure 9 is generally coiled 8 in coiling stations.

The melting installation 2a consists in each case of the electric arc furnace 2b, which can also be a two-vessel electric arc furnace installation 35 of the CONARC® type. Steel with the desired extremely low carbon contents (ULC steel=ultralow carbon steel), steel with controlled precipitates (IF steel=steel without interstitially dissolved foreign atoms in the solid solution), and high-strength and/or stainless steel is prepared in the following ladle metallurgy installation 3.

Figure 3:
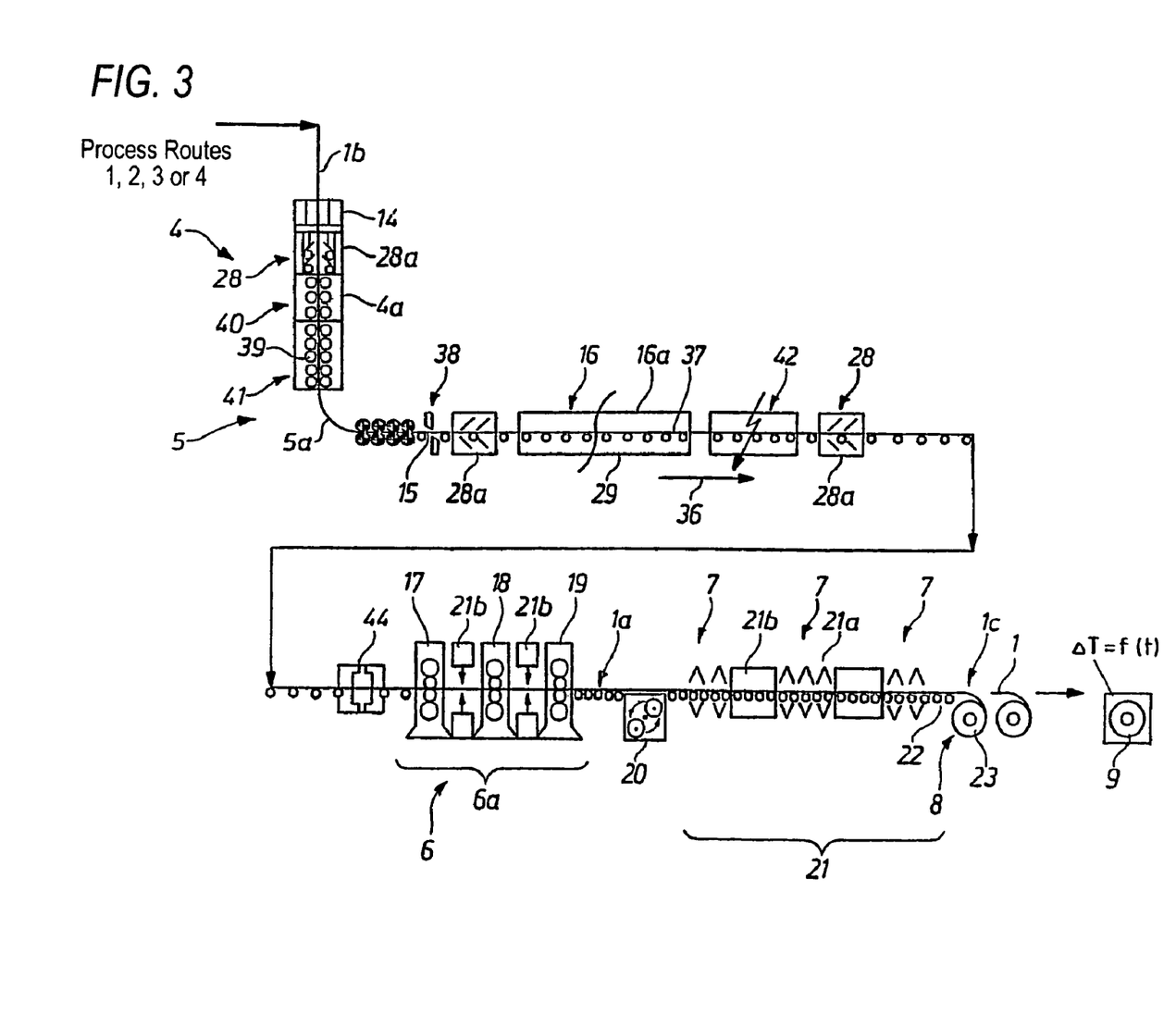
FIG. 3 shows the continuous casting and rolling installation with final microstructure adjustment downstream of the melting and ladle metallurgy installation.

The liquid steel 1b is cast in thin-slab format in the continuous casting machine 4a by means of a continuous casting mold 14. The material flow 36 includes at least one descaling system 28a for descaling 28, a shear 38 for producing partial lengths 15, a soaking furnace 16 (an additional soaking furnace 16a), the finishing mill 6a, and at least one runout table 22 with a cooling line 21 upstream or downstream of a first coiling station 20.

A first descaling system 28a, which is based on water jets, is provided in the continuous casting machine 4a for descaling 28 directly below the continuous casting mold 14.

In addition to this descaling system 28a, additional descaling systems 28a are located in the material flow 36 downstream of the continuous casting mold 14, downstream of the shear 38, and upstream of the first rolling stand 17 of the finishing mill 6a. Temperature control with oxidation protection 37 is provided in the soaking furnace 16 (possibly in 16a).

A liquid core reduction line 40 or a soft reduction line can be used upstream of the shear 38 in a containment roll stand 39 of the continuous casting machine 4a.

The continuous casting mold 14 can be a gate continuous casting mold, as is usually provided in CSP installations.

An inductive heating installation 42 can be arranged in the material flow 36 between the soaking furnace 16 and the first finishing stand 17, which is followed by several finishing stands 18 and a last finishing stand 19, or between the soaking furnace 16 and the descaling system 28a.

In addition, the cooling line 21 can comprise a laminar cooling line 21a combined with several intensive cooling boxes 21b.

The method for producing steel products 1 (FIG. 1) is characterized by the fact that the molten steel 1b is pretreated by alternative process routes 10, 11, 12, or 13 and cast into a thin slab 5a in the continuous casting mold 14; by the fact that the thin slab is descaled, possibly partially deformed, cut to partial lengths 15, subjected to repeated descaling 28, heated to rolling temperature, and homogenized in at least one soaking furnace 16 (or an additional soaking furnace 16a), generally (apart from a few exceptions) descaled again, and rolled in the finishing mill 6a; by the fact that the rolled product is coiled in a first coiling station 20 immediately downstream of the last finishing stand 19 or, alternatively, downstream of the cooling line 21; by the fact that the final microstructure 9 is adjusted in the cooling line 21 according to the desired grade of steel by cooling on the runout table 22; and by the fact that the rolled product 1a is generally finish-coiled in a second coiling station 23.

While the first to fourth process routes 10, 11, 12, and 13 in FIG. 1 have been explained only as a group, the process routes in FIGS. 2A and 2B will be individually explained in detail.

The first process route 10 (FIG. 2A) provides for charge materials from DRI/HBI (pellets or briquettes of direct reduced iron) or scrap in the electric arc furnace 2b with extremely low input sulfur contents. In the next treatment step 24, reduction of carbon and oxygen to extremely low values occurs in the process of partial-quantity degassing 27a within the vacuum degassing system 27. In the following treatment step 24, the temperature is increased by $\Delta T$ in the ladle furnace 25, and the degree of purity is adjusted by reduction of the <Al> content.

The second process route 11 (FIG. 2B) starts with the charging of DRI/HBI, scrap, hot metal, or pig iron, each with a low sulfur content, into an electric arc furnace installation 35. The electric arc furnace installation 35 can consist of either an electric arc furnace 2b or an installation for the CONARC® process. The next treatment step 24 takes place in the ladle furnace 25 with a temperature increase. In the following treatment step 24, a decarbonization, a desulfurization, a denitrogenation, and an increase in the degree of purity by reduction of the <Al> content to low values are carried out in the vacuum degassing system 27.

The third process route 12 (FIG. 2B) provides for the charging of DRI/HBI, scrap, hot metal, or pig iron, each with low input sulfur contents, into an electric arc furnace installation 35 or into an electric arc furnace 2b. In the following treatment step 24, a temperature increase $\Delta T$ takes place in the ladle furnace 25. In the next treatment step 24, differential-pressure vacuum degassing 43 is provided, in which carbon C, sulfur S and nitrogen N are reduced to very low values, and the degree of purity is increased by decomposition of the $Al_2O_3$ materials ($\Delta$ <Al>)

The fourth process route 13 (FIG. 2B) provides for the charging of DRI/HBI, scrap, hot metal, or pig iron, each with a low sulfur input content, into an electric arc furnace installation 35 or into an individual electric arc furnace 2b. In the next treatment step 24, a temperature increase $\Delta T$ takes place in the ladle furnace 25, which is immediately followed by a partial-quantity degassing 27a in the vacuum degassing system 27, which reduces carbon C and nitrogen N to very low values. In the last treatment step 24, a ladle degassing is carried out in the vacuum degassing system 27 to reduce sulfur S to low values and to increase the degree of purity by the decomposition of $Al_2O_3$ (Δ <Al>)

The most favorable or desired process route 10, 11, 12, or 13 is selected on the basis of economic considerations with respect to the costs of the charge material and the quality of the final product. The casting of thick or thin slabs, the energy sources to be used, and the required capital investments for the plant are also to be considered.

After the entry (FIG. 3) of the treated steel 1b, descaling 28 is carried out below the continuous casting mold 14.

Controlled high-temperature oxidation 29 by a controlled atmosphere is carried out in the soaking furnace 16.

In addition, the partial strand lengths 15 can be inductively heated downstream of the soaking furnace 16. Furthermore, an additional soaking heat treatment can be carried out in an additional soaking furnace 16a following the inductive heating installation 42. The partial strand lengths 15 are further inductively heated in the inductive heating installation 42 downstream of the soaking furnace 16. The ladle furnace 25 operates with an electrode system 31 and/or a top injection lance 32.

After the first finishing stand 17 and between the finishing stands 18, 19 of the finishing mill 6a, the partial lengths 15 can be subjected to controlled cooling. To this end, intensive cooling boxes 21b can be arranged between the finishing stands 17, 18, 19. An edger 44 can be positioned in front of the first finishing stand 17.

The coiled continuous product 1c is subjected to controlled cooling in the second coiling station 23.

The multiphase microstructure is adjusted in the cooling line 21 or in the coil 23.

Figure 4:
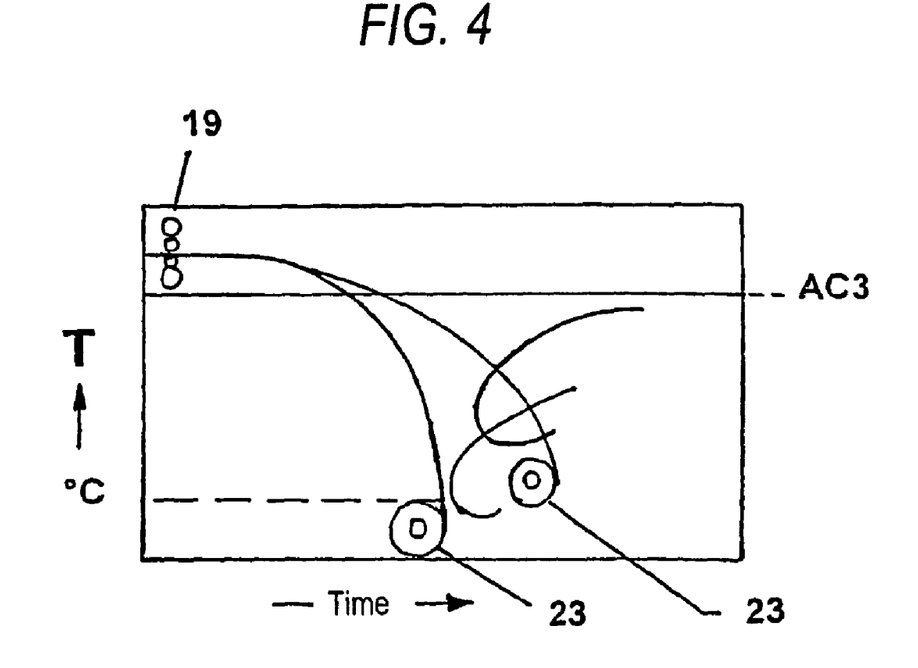
FIG. 4 shows a time-temperature-transformation diagram for cooling microstructure (austenitic, soft pearlite, bainite, and martensite) obtained after the last rolling stand of the finishing mill by cooling of the rolled product.

FIG. 4 shows a schematic temperature curve in a time-temperature-transformation diagram. The cooling curve of the solid material after the last rolling stand 19 during the coiling of the rolled product 1a in the second coiling station 23 passes through the transformation point AC3. The resulting final microstructure 9 can be austenite, soft pearlite, bainite, or martensite. The final structure 9 is thus produced during the rolling and cooling.

Figure 5:
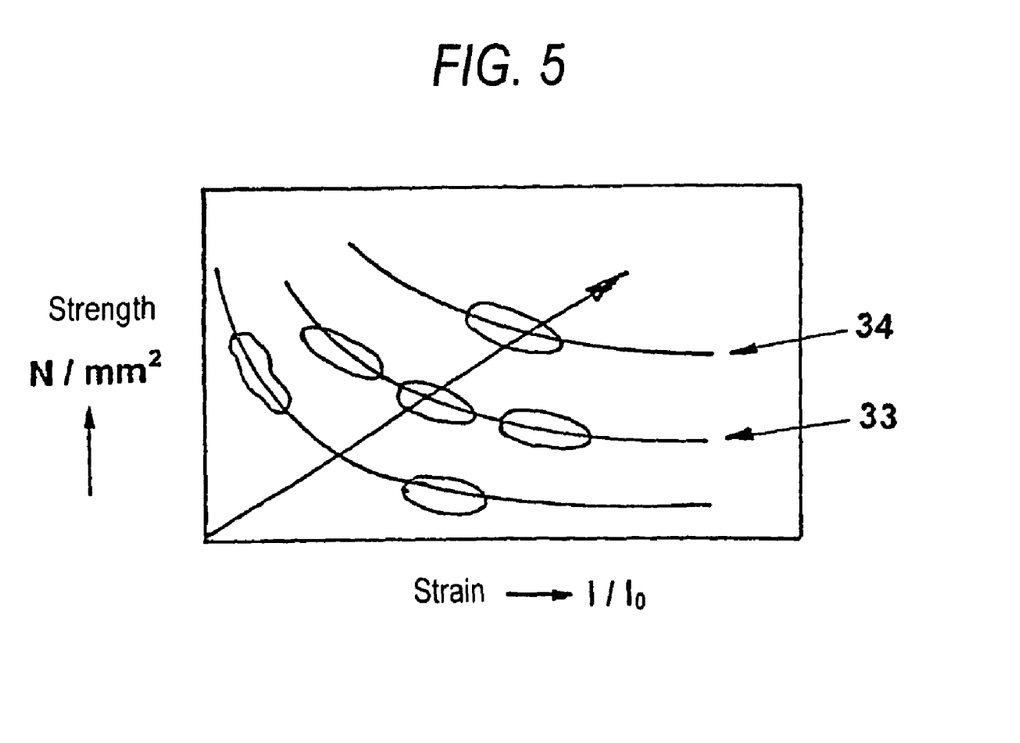
FIG. 5 shows a strength-strain diagram for multiphase steel grades (dual-phase steels, TRIP-phase steels).

FIG. 5 shows a diagram of strength (N/mm²) versus strain ($I/I_0$) for multiphase steel, e.g., dual-phase steel 33 and TRIP steel 34. The bottom curve shows normal behavior of steel at high strength and low strain.

LIST OF REFERENCE NUMBERS 1 steel product
1a rolled product
1b liquid steel
1c continuous product
2 melting
2a melting installation
2b electric arc furnace
3 ladle metallurgy installation
4 continuous casting
4a continuous casting machine
5 slab format
5a thin slab
6 rolling
6a finishing mill
7 cooling
8 coiling
9 final microstructure
10 first process route
11 second process route
12 third process route
13 fourth process route
14 continuous casting mold
15 partial length of strand
16 soaking furnace
16a additional soaking furnace
17 first finishing stand
18 finishing stand
19 last finishing stand
20 coiling station (carousel coiler)
21 cooling line
21a laminar cooling line
21b intensive cooling boxes
22 runout table
23 coiling station
23a controlled cooling device for coils
24 treatment steps
25 ladle furnace
26 alloying materials
27 vacuum degassing system
27a partial-quantity degassing
28 descaling
28a descaling system
29 controlled high-temperature oxidation
30 furnace vessel (converter or electric arc furnace)
31 electrode system
32 top injection lance
33 dual-phase steel
34 TRIP steel
35 electric arc furnace installation
36 material flow
37 controlled cooling and oxidation protection
38 shear
39 containment roll stand
40 liquid core reduction line
41 soft reduction line
42 inductive heating installation
43 differential-pressure vacuum degassing system
44 edger

The invention claimed is:

1. Installation for producing steel products (1) with optimum surface quality, with ultralow carbon contents, nitrogen contents, total oxygen contents, high-strength and/or stainless steel grades, comprising:

a melting installation (2a) for melting the steel and treating the steel, wherein the melting installation (2a) includes an electric arc furnace installation (35) with a ladle metallurgy installation (3) that is downstream with respect to material flow (36), a vacuum degassing system (27), a ladle furnace (25), a two vessel electric arc furnace, the ladle furnace (25) having an electrode system (31), a differential-pressure vacuum degassing system (43), and a system for partial-quantity degassing in the ladle furnace (25);

a continuous casting machine (4a) having a continuous casting old (14) for continuously casting the steel into slabs (5) or thin slabs (5a);

a shear (38) for cutting the slab into partial slab lengths (15);

a descaling system (28a) for descaling the slab lengths;

a soaking furnace (16) for heating the strand to a rolling temperature and homogenizing;

a finishing mill (6a) for rolling the strand, the finishing mill including a last finishing stand (19);

a cooling line;

a runout table (22);

a first coiling station (20) immediately downstream of the last finishing stand or downstream of the cooling line for coiling the strand, final microstructure of the steel being adjusted in the cooling line according to the desired grade of steel by cooling on the runout table; and a second coiling station (23) for finish-coiling the rolled product, wherein the descaling system is arranged immediately below the continuous casting mold and aligned along a common vertical axis with the continuous casting mold, wherein the melting installation is provided as a system capable of carrying out a plurality of process routes for producing molten steel based on the desired final microstructure, including the following routes:

(a) producing the molten steel (1b) in the melting installation (2a) which is not a steelworks converter and treating in the vacuum degassing system (27) and in the ladle furnace (25), and (b) melting in the electric arc furnace (2b) or in the two vessel electric arc furnace, and treating in the ladle furnace (25) with an electrode system (31) and in the vacuum degassing system, and (c) melting in the electric arc furnace installation (35) or the two vessel electric arc furnace (30) capable of a two stage process or an individual furnace vessel (30), and treating in the ladle furnace (25) and in the differential-pressure vacuum degassing system (43), and (d) melting in the electric arc furnace (2b) with additions of alloying materials (26), and treating by partial-quantity degassing in the ladle furnace (25), or the vacuum degassing system (27) and a ladle degassing (27).

2. Installation in accordance with claim 1, wherein in addition to a descaling system (28a) downstream of the continuous casting mold (14) and a descaling system (28a) downstream of the shear (38), an additional descaling system (28a) is provided upstream of the first rolling stand (17) of the finishing mill (6a).

3. Installation in accordance with claim 1, wherein a liquid core reduction line (40) or a soft reduction line (41) is arranged upstream of the shear (38) in a containment roll stand (39) of the continuous casting machine (4a).

4. Installation in accordance with claim 1, wherein the continuous casting mold (14) is designed as a continuous casting mold with a pouring gate.

5. Installation in accordance with claim 1, wherein an inductive heating installation (42) is provided in a material flow (36) between the soaking furnace (16) and the first rolling stand (17) of the finishing mill (6a) or the descaling system (28a).

6. Installation in accordance with claim 1, and further comprising a cooling line (21) that includes a laminar cooling line (21a) combined with several intensive cooling boxes (21b).

* * * * *